United States Patent [19]

Okamoto et al.

[11] Patent Number: 5,778,140
[45] Date of Patent: *Jul. 7, 1998

[54] VIDEO SIGNAL PROCESSING APPARATUS

[75] Inventors: Hiroo Okamoto, Yokohama; Masuo Oku, Kamakura; Takaharu Noguchi; Takao Arai, both of Yokohama, all of Japan

[73] Assignee: Hitachi, Ltd., Tokyo, Japan

[*] Notice: The term of this patent shall not extend beyond the expiration date of Pat. No. 5,627,655.

[21] Appl. No.: 813,339

[22] Filed: Mar. 7, 1997

Related U.S. Application Data

[62] Division of Ser. No. 331,269, Oct. 28, 1994, Pat. No. 5,627,655, which is a continuation of Ser. No. 104,478, Jul. 28, 1993.

[30] Foreign Application Priority Data

Jul. 28, 1992 [JP] Japan .................. 4-201414

[51] Int. Cl.$^6$ .................. H04N 5/91; H04N 5/928; G11B 23/28
[52] U.S. Cl. .................. 386/94; 386/95; 380/3
[58] Field of Search .................. 386/94, 95; 380/5, 380/10, 7, 3, 11, 15; 360/60, 37.1, 27, 15; H04N 5/91; G11B 23/28

[56] References Cited

U.S. PATENT DOCUMENTS 4,914,694  4/1990  Leonard et al. .
5,097,348  3/1992  Suetaka .
5,157,510  10/1992  Quan et al. .
5,191,434  3/1993  Kim .
5,418,853  5/1995  Kanota et al. .

FOREIGN PATENT DOCUMENTS

| 0224929 | 6/1987 | European Pat. Off. . |
| 0256753 | 2/1988 | European Pat. Off. . |
| 0297242 | 1/1989 | European Pat. Off. . |
| 0328141 | 8/1989 | European Pat. Off. . |
| 0348218 | 12/1989 | European Pat. Off. . |
| 0418964 | 3/1991 | European Pat. Off. . |
| 0422849 | 4/1991 | European Pat. Off. . |
| 61-288582 | 12/1986 | Japan . |
| 289255 | 3/1990 | Japan . |
| 8502293 | 5/1985 | WIPO . |
| 9200649 | 1/1992 | WIPO . |

*Primary Examiner*—Robert Chevalier
*Attorney, Agent, or Firm*—Antonelli, Terry, Stout & Kraus, LLP

[57] ABSTRACT

In a reproducing apparatus, a generator circuit for adding copy information during the vertical blanking period of a reproduced video signal output is provided, and copy information in compliance with copy information contained in the reproduced signal is added and delivered. In a recording apparatus, a detection circuit for detecting copy information in an inputted video signal is provided, and permission/inhibition of copy is controlled on the basis of the detected copy information and when copy is permitted, necessary copy information is generated and added to a recording signal.

10 Claims, 3 Drawing Sheets

VIDEO SIGNAL PROCESSING APPARATUS

This application is a 37 CFR §1.60 divisional of prior application Ser. No. 08/331,269, filed Oct. 28, 1994 (allowed U.S. Pat. No. 5,627,655), which is a continuation of application Ser. No. 08/104,478, filed Jul. 28, 1993 now abandoned.

BACKGROUND OF THE INVENTION

The present invention relates to a recording apparatus and a reproducing apparatus which are adapted to record/reproduce a video signal by converting it into a digital signal and more particularly to an apparatus suitable for limiting copy or copying of software (the contents of a recorded recording medium).

Conventionally, as a method for limiting copy of software in a video signal recording/reproducing apparatus, a technique as described in JP-A-61-288582 whose priority is U.S. application Ser. No. 724006, filed on Apr. 17, 1985 has been used principally wherein a false synchronization pulse is inserted to prevent normal recording. According to this, detection of a video signal level is effected erroneously in the presence of the false synchronization pulse during recording, so that a gain control circuit is operated erroneously to give rise to an unsatisfactory recording result.

The aforementioned conventional technique is for causing the gain control circuit of the recording apparatus to erroneously operate to thereby obtain an unsatisfactory recording result but essentially, it does not inhibit recording operation completely and therefore the results of copy or copying of software inhibited from being copied depend on the performance of the recording apparatus to some extent. Further, the presence or absence of the false synchronization pulse can in effect permit a simple limitation on copying but failed to take care of software which is scheduled to be copied permissibly only once but is inhibited from undergoing the second and ensuing copy operations (namely, in the case where the number of copy operations is limited).

Also, JP-A-2-89255 discloses a digital audio tape recorder (DAT) wherein a copy control signal of two bits indicative of permission/inhibition of copy is added to a digital audio signal, the permission/inhibition of copy of the digital audio signal and a limitation on the number of copy operations are decided on the basis of the copy control signal, and control of copy of the digital audio signal is executed in accordance with a result of the decision.

SUMMARY OF THE INVENTION

An object of the present invention is to provide a recording apparatus and a reproducing apparatus for video signals wherein a control signal relating to a video signal to be recorded or reproduced is added to the video signal in advance, and during recording or reproduction of the video signal, the control signal is detected and it is added to the video signal so as to be recorded or reproduced after being changed as necessary.

According to the invention, the control signal includes copy information concerning permission/inhibition of copying of a video signal or a limitation on the number of copy operations, program information for indicating the total time, lapse time, residual time and title of video software or image processing information indicative of a compression processing system used when the video signal is subjected to processing. The control signal is formed of a plurality of bits and is preferably inserted during the blanking period of the video signal but for a digital video signal, it may be positioned in front of a video signal field.

Especially when the control signal is copy information, copy information is added to a reproduction video signal output during reproduction in compliance with the contents of copy information added in advance to a reproduction video signal from a recording medium. During recording, copy information in an inputted video signal is detected and permission/inhibition of copy (record) of the input video signal is controlled on the basis of the detected copy information. When copying (recording) an input video signal, suitably generated copy information is added to a video signal to be recorded in compliance with the presence or absence of copy information added in advance to the input video signal or the contents of the copy information. In this manner, the limitation on the number of copy operations can be dealt with and highly reliable copy control can be ensured.

DESCRIPTION OF THE PREFERRED EMBODIMENTS

The present invention will be described hereunder by referring to illustrated embodiments.

Figure 1:
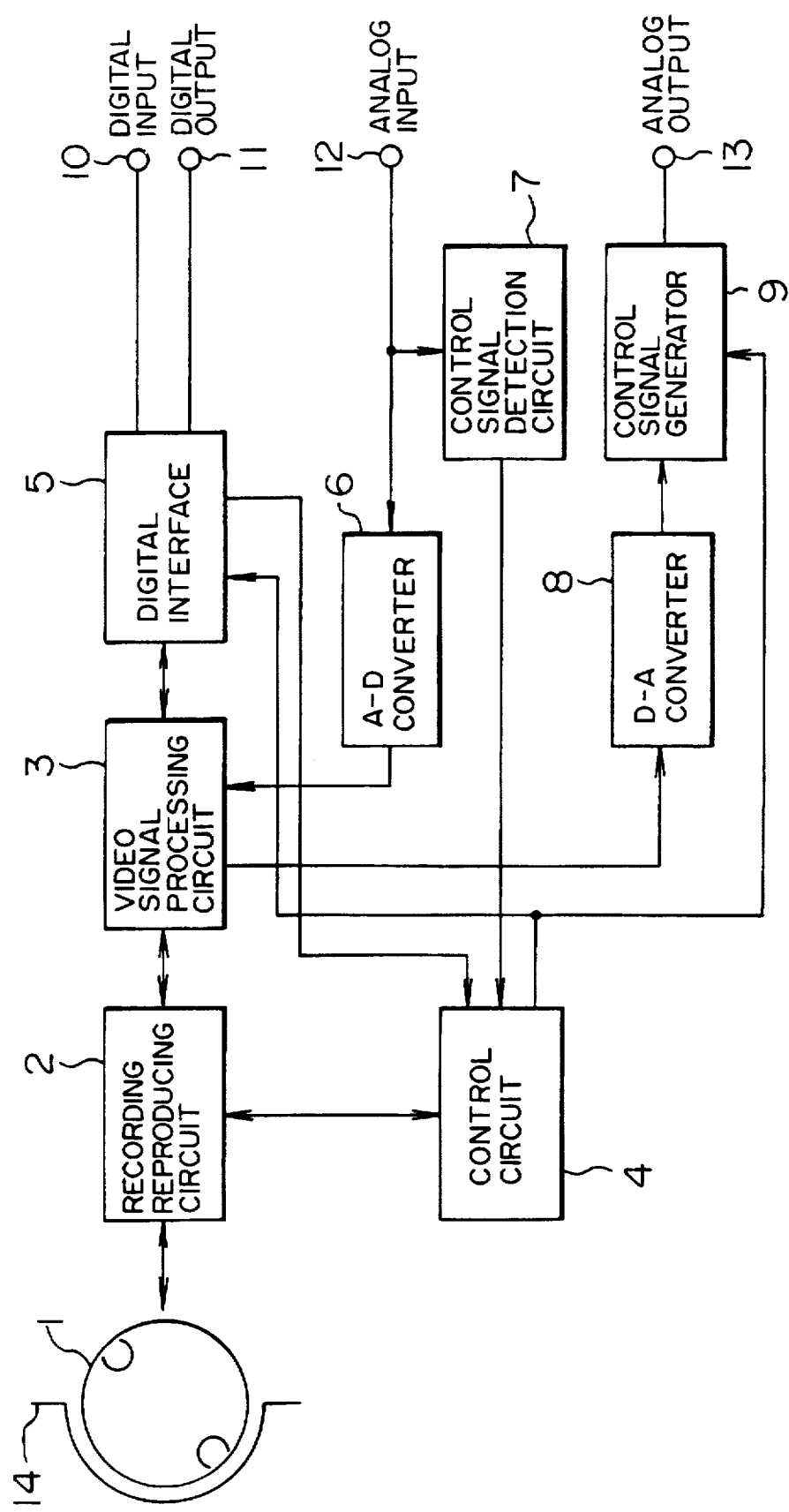
FIG. 1 is a block diagram showing a construction of an essential part of a video signal recording/ reproducing apparatus according to an embodiment of the invention.

FIG. 1 is a block diagram showing an essential construction of a digital video recording/reproducing apparatus (digital VTR) according to an embodiment of the present invention. In the Figure, 1 designates a rotary head for recording/reproducing a video signal on/from a magnetic tape 14, 2 a recording/reproducing circuit for performing generation of a recording signal during recording and detection of data during reproduction, 3 a video signal processing circuit for performing compression and expansion of a video signal and the like processing, 4 a recording/reproducing control circuit for controlling recording/reproducing operation, 5 a digital interface circuit (hereinafter referred to as an interface circuit) for performing input/output operation of a digital video signal, 6 an A/D conversion circuit for converting an analog video signal into a digital signal, 7 a control signal detection circuit for detecting a control signal contained in the analog video signal, 8 a D/A conversion circuit for converting a digital video signal into an analog signal, 9 a control signal generator for adding the control signal to the analog video signal, 10 an input terminal of a digital video signal, 11 an output terminal of a digital video signal, 12 an input terminal of an analog video signal, and 13 an output terminal of an analog video signal.

With the above construction, operation will now be described by referring to a case where the control signal contains copy information. During recording of an analog video signal, the video signal inputted from the input terminal 12 is converted by the A/D converter 6 into a digital signal and the digital signal is inputted to the video signal processing circuit 3. The digital signal is then subjected to compression and the like processing, added with an error correction code, control information and the like at the recording/reproducing circuit 2 and recorded on the magnetic tape 14 by means of the rotary head 1. At that time, in the control signal detection circuit 7, copy information contained in the analog video signal is detected and outputted to the recording/reproducing control circuit 4. The recording/reproducing control circuit 4 decides permission/ inhibition of copy in accordance with the contents of the copy information or the presence or absence of copy information and when determining permissibility of copy, it generates copy information to be recorded on the magnetic tape 14. When the recording/reproducing control circuit 4 has determined the permissibility of copy, it causes the recording/reproducing circuit 2 to record the video signal together with the generated copy information added thereto on the magnetic tape 14 but when the recording/reproducing control circuit 4 has determined inhibition of copy, it inhibits the recording/reproducing circuit 2 from performing recording operation per se.

During recording of a digital video signal, on the other hand, the digital signal inputted from the input terminal 10 is applied to the interface circuit 5. The interface circuit 5 separates a video signal and detects a control signal from the input signal. Then, the video signal is inputted to the video signal processing circuit 3 and the control signal is inputted to the recording/reproducing control circuit 4. In this phase, as in the case of the recording of an analog video signal, the recording/reproducing control circuit 4 also decides permission/inhibition of copy in accordance with the contents of the control signal including copy information and when determining permissibility of copy, it generates copy information to be recorded on the magnetic tape 14. With the permissibility of copy determined, the recording/ reproducing circuit 2 records the video signal together with the copy information, generated by the recording/ reproducing control circuit and added to the video signal, on the magnetic tape 14 but with inhibition of copy determined, the recording/ reproducing control circuit 4 is inhibited from performing recording operation per se.

During reproduction, a signal reproduced from the magnetic tape 14 by means of the rotary head 1 is inputted to the recording/reproducing circuit 2. In the recording/ reproducing circuit 2, error correction, detection of a control signal and the like are carried out. Then, a video signal is inputted to the video signal processing circuit 3 so as to undergo expansion and the like processing and thereafter it is delivered to the interface circuit 5 and D/A conversion circuit 8. The control signal (containing at least copy information) is inputted to the recording/reproducing control circuit 4. The recording/reproducing control circuit 4 decides the contents of the copy information reproduced from the magnetic tape 14 and it generates, in accordance with that contents, copy information (control signal) to be added to a video signal output. Then, in the interface circuit 5, a digital video signal delivered out of the video signal processing circuit 3 is added with the copy information (control signal containing copy information) generated from the recording/reproducing control circuit 4 and is delivered through the output terminal 11. On the other hand, in the control signal generator 9, an analog video signal delivered out of the D/A conversion circuit 8 is added with the copy information generated from the recording/ reproducing control circuit 4 and is delivered through the output terminal 13.

In the recording/reproducing control circuit 4, recording/ reproducing is controlled by a technique using the copy information, and an example of the technique will be described below. It is now assumed that the aforementioned copy information is of 2 bits wherein "00" is recorded for the case that copy of software or the like prepared by the user need not be limited, "01" is recorded for the case that copy is not at all permitted and "11" is recorded for the case that copy is permitted only once. During reproduction, a digital video signal and an analog video signal are each added with something equivalent to copy information detected from a reproduction signal and are then delivered.

During recording, on the other hand, recording is controlled in accordance with copy information added to an inputted digital video signal or analog video signal. When the copy information in an input signal is "00", recording is effected by rendering copy information to be recorded also to be "00". When the copy information is "11" (when copy is permitted to be done only once), recording is effected by rewriting copy information to be recorded to "10". When the copy information contained in the input signal is "10", copy inhibition is determined and recording is not carried out (rewrite to "10" instead of "01" is carried out when the copy information is "11" in order to discriminate the case where the tape is initially inhibited completely from being copied from the case where the tape is inhibited from being copied after copying, and even rewrite of "11" to "01" may be allowed without adversely affecting controlling). A timing clock generation circuit used conventionally in general is included in the circuit system shown in FIG. 1 and operation timing of each circuit block is controlled by a timing pulse generated from the generation circuit.

Figure 2:
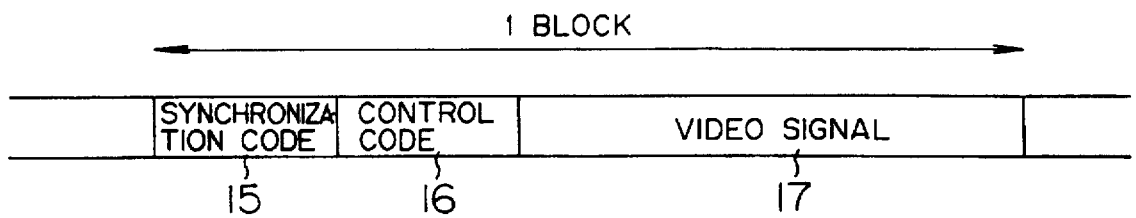
FIG. 2 is a diagram for explaining an example of a digital input/output signal according to an embodiment of the invention.

FIG. 2 shows an example of a digital input/output signal. As shown in the Figure, the digital input/output signal is formatted in a unit of block and one block consists of a synchronization code 15, a control code 16 and a video signal 17. The control code 16 then consists of the above-described copy information of 2 bits and other information recorded together with the video signal. The video signal 17 is formed of a digital video signal of a plurality of words. If a compressed signal is used as the video signal, then the transmission rate of the digital input/output signal can be decreased. In this case, information about a compression system may be included in the control code. Further, if the signal of FIG. 2 is modulated, for example, so as to reverse a level of data only at a boundary between bits when the data takes "0" level and reverse a level of data at a boundary between bits or at a middle portion of bit when the data takes "1" level and is subsequently transmitted, then it is possible to detect the clock period and therefore the synchronization clock need not be transmitted.

Figure 3:
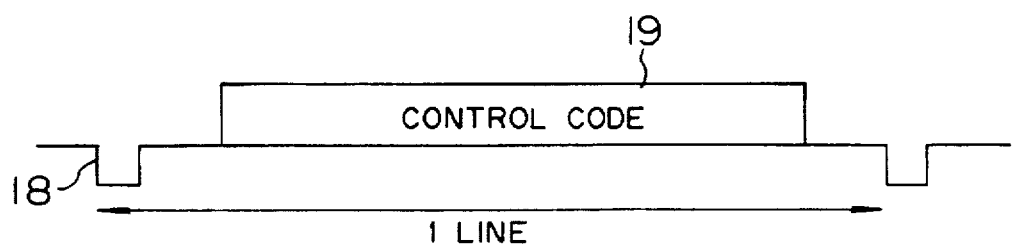
FIG. 3 is a diagram for explaining a control signal in an analog input/output signal according to an embodiment of the invention.

FIG. 3 shows an example of an analog input/output signal at the time of a vertical blanking period. In the Figure, 18 designates a horizontal synchronizing pulse and 19 a control signal. The vertical blanking period is a portion which is not displayed on the screen and in which an ordinary analog video signal takes a non-signal state. By adding a control signal to this portion as in the case of the digital input/output signal, the control signal, such as the above-described copy information of 2 bits, can be transmitted even when an image is transmitted in the form of an analog signal.

Figure 4:
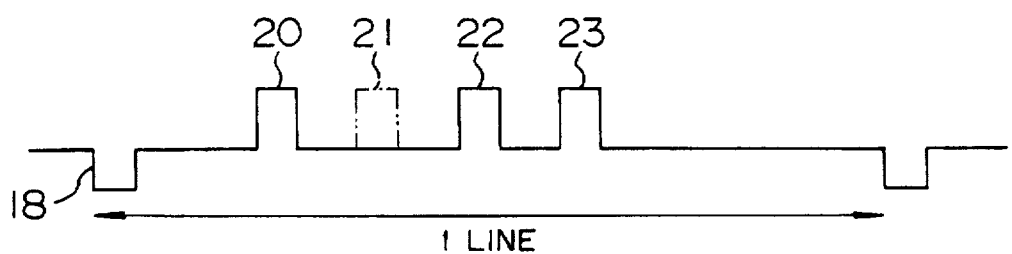
FIG. 4 is a diagram for explaining an example of copy information in an analog input/output signal according to the invention.

FIG. 4 shows an example of addition of copy information as control information of an analog input/output signal. In the Figure, 20 and 23 designate synchronizing signals and 21 and 22 copy information. Here, the copy information is of 2 bits and ability to detect it is improved by adding the synchronizing signals before and after the copy information. If the copy information is written in multiplex fashion over a few lines, detection ability can further be improved.

Figure 5:
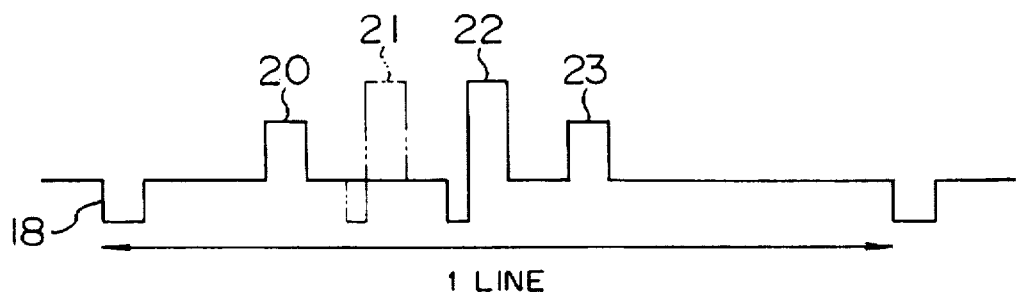
FIG. 5 is a diagram for explaining another example of copy information in an analog input/output signal according to the invention.

FIG. 5 shows another example of addition of copy information as control information of an analog input/output signal. In FIG. 5, copy information is added in the form of a signal similar to the false synchronization pulse described in the aforementioned JP-A-61-288582. Through this, copy can be limited even when recording is effected with an ordinary analog video tape recorder. In addition, when the control signal detection circuit 7 is designed so as to be capable of also detecting the false synchronization pulse, copy can also be limited in the case that a video signal reproduced by the analog video tape recorder is recorded.

Figure 6:
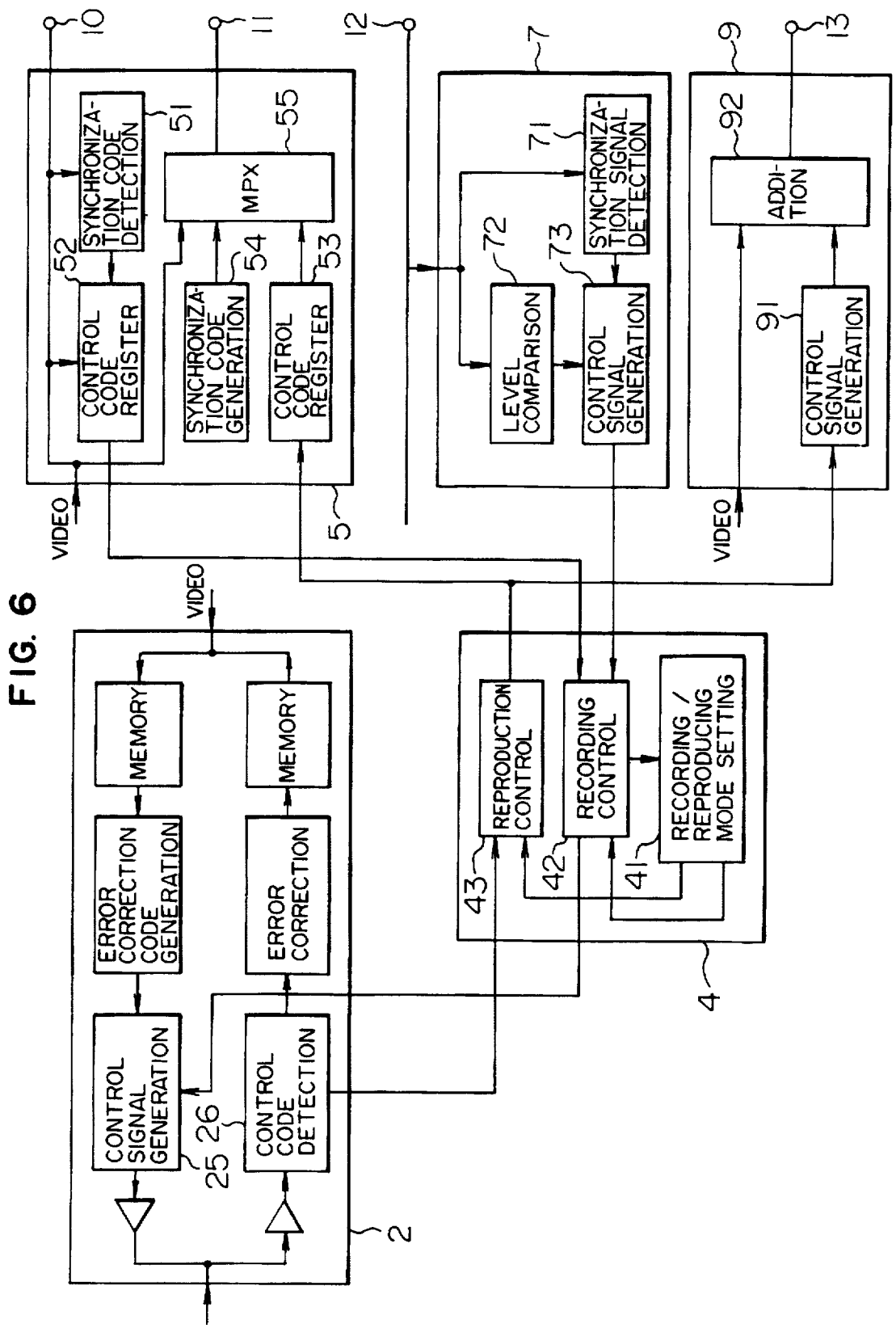
FIG. 6 is a block diagram showing, in greater detail, the essential part of FIG. 1.

FIG. 6 is a block diagram showing, in greater detail, circuit components relating to the flow of the control code or signal. Referring to FIG. 6, a description will be given by taking the aforementioned copy information of 2 bits, for instance.

Firstly, operation during recording of an analog video signal will be described. The analog video signal as shown in FIG. 4 is inputted from the input terminal 12 and supplied to the control signal detection circuit 7. A synchronization signal detection circuit 71 detects horizontal synchronizing signals 18 associated with the vertical blanking period of the inputted video signal and generates timing pulses at timings of 2-bit copy information 21, 22 by utilizing synchronizing signals 20 and 23 in FIG. 4 through a well known method. A level comparison circuit 72 compares the input video signal with a threshold level as shown at chained line in FIG. 4 to deliver a high level when the video signal level exceeds the threshold level. Responsive to the timing pulses from the synchronization signal detection circuit 71, a control signal register 73 takes in the output level of the level comparison circuit 72 as copy information and transfers the copy information to the recording/ reproducing control circuit 4.

In the recording/reproducing control circuit 4, when recording/reproducing drive operation is actuated, a recording/reproducing mode setting circuit 41 sends a recording command signal and a reproduction command signal to a recording control circuit 42 and a reproduction control circuit 43, respectively. In receipt of the recording command signal from the recording/reproducing mode setting circuit 41, the recording control circuit 42 transfers, when the inputted copy information assumes "00" to indicate that recording is not limited, "00" as it is but when the copy information assumes "11" to indicate that copy is permitted to be effected only once, it converts "11" into "10" to transfer the same to the recording/ reproducing circuit 2. When the copy information assumes "10" or "01" to indicate inhibition of recording, the recording control circuit 42 releases the recording mode of the recording/reproducing mode setting circuit 41 in spite of the fact that the recording command signal is inputted, thereby preventing execution of recording operation.

In the recording/reproducing circuit 2, the inputted copy information is added to a digital video signal by means of a control signal generator 25. The control signal generator has the same construction as that of a digital video signal generation section of interface circuit 5 to be described later and will be understood from a description to be given of that section hereinafter.

Next, operation during recording of a digital video signal as shown in FIG. 2 will be described. The digital video signal inputted from the input terminal 10 is applied to a synchronization code detection circuit 51. This circuit 51 detects a synchronization code 15 of FIG. 2 and on the basis of the detected synchronization code, it generates a timing signal timed to the presence of copy information in a control code 16 through the use of a well known method. At the time that the timing pulse is generated from the synchronization code detection circuit 51, a control code register 52 takes in the 2-bit copy information and delivers it to the recording control circuit 42. After that, the recording/reproducing control circuit 4 and recording/ reproducing circuit 2 operate in the same manner as described previously.

Operation during reproduction will now be described.

A digital video signal reproduced from the magnetic tape 14 is inputted to the recording/reproducing circuit 2, and copy information is detected by means of a control code detection circuit 26 and supplied to the recording/ reproducing control circuit 4. The inputted copy information is applied to the control signal generator 9 and interface circuit 5 through the reproduction control circuit 43.

In the control signal generator 9, the inputted copy information is converted into a signal level matching an analog signal by means of a control signal generation circuit 91 and is then supplied to an adder circuit 92. At timings as shown in FIG. 4 appearing during the vertical blanking period of an analog video signal supplied from the D/A converter 8, the adder circuit 92 adds the copy information together with synchronizing signals to the video signal and delivers a resulting signal to the output terminal 13. The timings for the addition of the copy information to the video signal are controlled by a timing pulse for controlling the operation timing of the entire circuit system, which timing pulse is generated from the timing pulse generation circuit.

In the interface circuit 5, on the other hand, the copy information is temporarily held in a control code register 53. A synchronization code generation circuit 54 generates a synchronization code as shown in FIG. 2 at a predetermined timing. A multiplexer 55 executes input switching control under the control of the timing pulse in order of the synchronization code from the synchronization code generation circuit 54, the copy information from the control code register 53 and the video signal from the video signal processing circuit 3, thereby generating a digital video signal as shown in FIG. 2 which is delivered to the digital output terminal 11. Structurally, the multiplexer resembles the control signal generator 25 included in the recording/ reproducing circuit 2.

In the foregoing description, the video signal has been described as being added with the control information standing for the copy information but for a video signal not added with a control code or copy information, new copy information "00" may be generated on the assumption that copy information is, for example, "00" and it may be added to the video signal. In case where a false synchronization pulse is inserted during the vertical blanking period, when the false synchronization pulse inserted as copy information is detected, the copy information is processed in accordance with the procedure described on the basis of FIG. 6 but when the false synchronization pulse is not detected, "00" is generated as copy information and can be inserted in a video signal. In this manner, exchangeability with conventional tape recorders can be maintained.

The digital video tape recorder has been described as an example in connection with FIG. 1 but a use with an analog tape recorder may be realized readily by replacing the control signal generator 25 with a circuit similar to the control signal generator 9 and replacing the control code detection circuit 26 with a circuit similar to the control signal detection circuit 7.

Further, while the apparatus for recording and reproducing has been described, the present invention may also be applied to an apparatus dedicated to recording or an apparatus dedicated to reproduction. Information other than the copy information can be transmitted as the control signal. For example, program information or the like recorded by being added to a video signal may be transmitted by being added to an analog video signal during copying, and a control signal to be recorded may be generated by using that information. In this manner, control information can be copied even in copy by analog video signals.

As described above, according to the present invention, the number of copy operations can be limited even when a video signal is copied through an analog video signal, and highly reliable copy control can be executed.

We claim:

1. A video signal processing apparatus with a control code generator arrangement, said apparatus comprising:
   means for inputting a digital video signal;
   a control code detection means for detecting a digital control code contained in the inputted digital video signal, said digital control code commanding at least copy information;
   a control code reconstructing means for forming a reconstructed digital control code to be added to said video signal to command a subsequent at least copy information;
   a video signal processing means for processing said digital video signal to produce at least one processed digital video signal;
   a D/A converter of converting a processed digital video signal from said video signal processing means into an analog video signal;
   a first adding means for adding said reconstructed digital control code from said control code reconstructing means to a portion of a vertical blanking period of said analog video signal to produce an analog video signal with said reconstructed digital control code to output said produced analog video signal; and
   a second adding means for adding said reconstructed digital control code to video signal from said video signal processing means to produce a digital video signal with said reconstructed digital control code to output said produced digital video signal.

2. A video signal processing apparatus as claimed in claim 1, wherein said digital control code is copy information indicative of permission/inhibition of copying of a video signal recorded on said recording medium.

3. A video signal processing apparatus as claimed in claim 2, wherein said copy information contains information about at least one of an inhibition of copying, permission of copying and limitation on a number of times of copying operations.

4. A video signal processing apparatus as claimed in claim 1, wherein said adding means inserts said reconstructed digital control code from said control code reconstructing means into a blanking period of said analog video signal.

5. A video signal processing apparatus as claimed in claim 1, wherein a false synchronization pulse is added to said video signal to be outputted in addition to said reconstructed digital control code.

6. A video signal processing apparatus with a control code generator arrangement, said apparatus comprising:
   an input terminal for inputting a digital video signal;
   a control code detector detecting a digital control code contained in the inputted digital video signal, said digital control code commanding at least copy information;
   a control code reconstructor forming a reconstructed digital control code to be added to said video signal to command a subsequent at least copy information;
   a video signal processor processing said digital video signal to produce at least one processed digital video signal;
   a D/A converter converting a processed digital video signal from said video signal processing means into an analog video signal;
   a first adder adding said reconstructed digital control code from said control code reconstructor to a portion of a vertical blanking period of said analog video signal to produce an analog video signal with said reconstructed digital control code to output said produced analog video signal; and
   a second adder adding said reconstructed digital control code to a processed digital video signal from said video signal processor to produce a digital video signal with said reconstructed digital control code to output said processed digital video signal.

7. A video signal processing apparatus as claimed in claim 6, wherein said digital control code is copy information indicative of permission/inhibition of copying of said video signal recorded on a recording medium.

8. A video signal processing apparatus as claimed in claim 7, wherein said copy information contains information about at least one of an inhibition of copying, permission of copying and limitation on a number of times of copying operations.

9. A video signal processing apparatus as claimed in claim 6, wherein said first adder inserts said reconstructed digital control code from said control code reconstructor into a blanking period of said analog video signal.

10. A video signal processing apparatus as claimed in claim 6, wherein a false synchronization pulse is added to said video signal to be outputted in addition to said reconstructed digital control code.

* * * * *